United States Patent

[11] 3,628,558

| [72] | Inventor | James Melvin Bahl<br>Waterloo, Iowa |
|---|---|---|
| [21] | Appl. No. | 68,984 |
| [22] | Filed | Sept. 2, 1970 |
| [45] | Patented | Dec. 21, 1971 |
| [73] | Assignee | Deere & Company<br>Moline, Ill. |

[54] HYDRAULIC CONTROL VALVE
10 Claims, 1 Drawing Fig.

[52] U.S. Cl. .................................................. 137/118,
91/412, 137/119
[51] Int. Cl. ...................................................... G05d 15/00
[50] Field of Search ............................................ 91/412;
137/118, 119, 109, 115

[56] References Cited
UNITED STATES PATENTS
3,500,854  3/1970  Altmeppen .................. 137/118
3,099,284  7/1963  Thrap ........................... 137/118
3,049,670  10/1967  Bahl ............................. 91/412

Primary Examiner—Samuel B. Rothberg
Assistant Examiner—William H. Wright
Attorneys—H. Vincent Harsha, Harold M. Knoth, William A. Murray and John M. Nolan ABSTRACT: A hydraulic system has a pump, which supplies fluid pressure for both primary and secondary hydraulic functions. A hydraulic control valve is disposed in the system to shut off the fluid pressure supplied to the secondary hydraulic functions when the flow rate required by the hydraulic functions exceeds the pump capacity to cause a reduction in pressure below a predetermined value. The control valve also disconnects the secondary hydraulic function from the rest of the system when the secondary function generates surge pressures above a predetermined value and simultaneously connects the secondary function to the reservoir, so that the valve also functions as a check and relief valve for the secondary function. The valve further automatically connects the pump to the reservoir when the pump is driven at very low speeds and produces a very low-flow rate, such as during starting of the engine which drives the pump, to lessen the load on the starting motor.

PATENTED DEC 21 1971                                      3,628,558
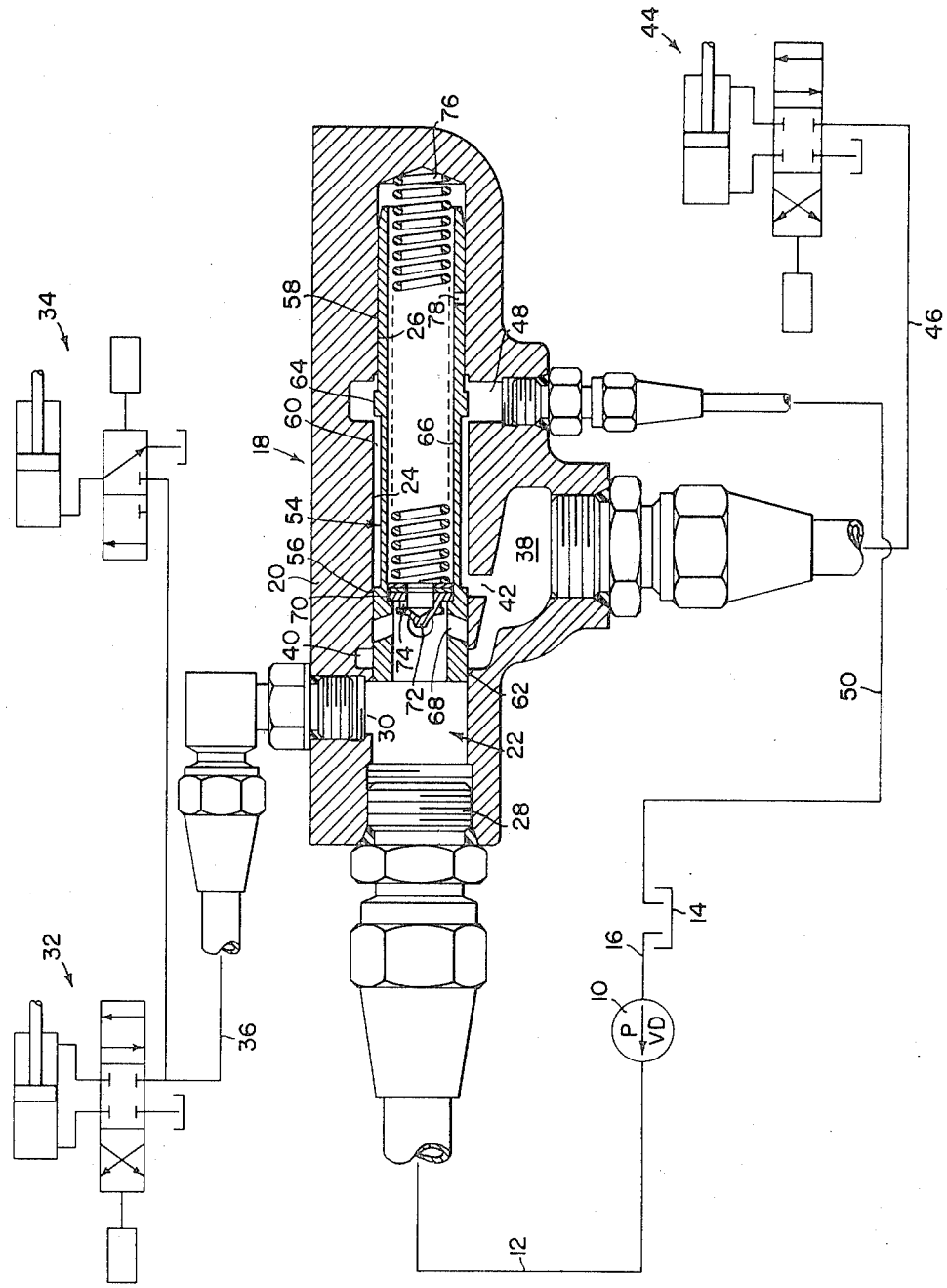
INVENTOR.
J. M. BAHL

HYDRAULIC CONTROL VALVE

BACKGROUND OF THE INVENTION

This invention relates to a hydraulic control valve and more particularly to an improved priority-type control valve which supplies fluid pressure to a plurality of hydraulic functions and provides priority to the fluid pressure supply for one or more of they hydraulic functions.

Such a valve is described in U.S. Pat. No. 3,349,670, issued 31 Oct. 1967 to J. M. Bahl et al., also assigned to the assignee herein. As described in said patent, such a priority valve has particular utility on an agricultural or industrial tractor wherein a single hydraulic pump generally supplies fluid pressure for the power steering, power brakes, and various other hydraulic functions such as the tractor rockshaft, a tractor-mounted loader or backhoe, or hydraulic cylinders on tractor-towed implements. For safety purposes, it is desirable that the power steering and brakes have priority to the fluid pressure supply over the remaining hydraulic functions, and the valve disclosed in said patent does provide such priority by automatically shutting off the fluid pressure supply to the nonpriority functions whenever the flow rate exceeds the capacity of the pump and causes a reduction in pressure below a predetermined value.

In actual use, it has been found that certain hydraulically actuated implements can cause surge pressures in the tractor hydraulic system. For example, a typical tractor hydraulic system will operate at approximately 2,000 p.s.i., while surge pressures in the magnitude of 4,000 to 5,000 p.s.i have been produced by certain hydraulically actuated implements, which, of course, are nonpriority functions. To strengthen the hydraulic system to withstand such surge pressures, would, of course, greatly increase the cost of the system.

Another problem encountered in such tractor hydraulic systems revolves around the fact that the variable delivery hydraulic pump, which is always connected to the engine output shaft, would normally tend to bring the system pressure up to the standby pressure of approximately 2,000 p.s.i. and system leakage at standby pressure requires approximately one-half horsepower to maintain the standby pressure, thereby imposing a one-half horsepower load on the starting motor when the engine is being started. Also, if the nonpriority functions included in accumulator, the starting motor would also have to supply the power to pump up the accumulator.

SUMMARY OF THE INVENTION

According to the present invention, there is provided an improved priority-type control valve of the type shown in said U.S. Pat. No. 3,349,670, whereby the priority valve also functions as a relief valve and check valve for the nonpriority functions, so that when the nonpriority functions produce surge pressures in excess of a predetermined value, the valve will automatically disconnect the nonpriority function from the rest of the hydraulic system and connect it to the reservoir until the pressure returns to its normal value. The improved valve also includes means for automatically connecting the pump to the reservoir during the starting of the engine to reduce the load on the starting motor and thereby increase the starting speed. The valve also locks out any accumulators in the nonpriority functions during the starting of the engine.

An important feature of the invention resides in the fact that the above functions are provided without materially increasing the cost or complexity of the hydraulic system.

BRIEF DESCRIPTION OF THE DRAWING

The sole FIGURE is a schematic view of a hydraulic system including the improved priority valve, which is shown in section in its check and relief mode, wherein it disconnects the nonpriority hydraulic function from the rest of the system.

DESCRIPTION OF THE PREFERRED EMBODIMENT

The invention is embodied in a tractor hydraulic system having an engine-driven variable displacement hydraulic pump 10 having a discharge or outlet line 12 and connected to a hydraulic reservoir 14 by an inlet conduit 16.

A priority valve, indicated in its entirety by the numeral 18, has a valve body 20 with a generally cylindrical bore 22 open at one end. The bore 22 includes a larger diameter bore portion 24 adjacent its open end and a smaller diameter bore portion 26 adjacent its closed end. Preferably, the difference in diameter of the two bore portions 24 and 26 is relatively small, so that the larger bore portion 24 has only a slightly larger cross sectional area than the smaller bore portion 26. The open or larger end of the bore is provided with an axially extending threaded fitting 28, which connects the valve bore to the pump outlet conduit 12.

The larger bore portion 24 communicates with a radially extending priority outlet port 30, which is connected to a pair of priority hydraulic functions 32 and 34 via a priority conduit 36. The priority hydraulic functions 32 and 34 are respectively illustrated as double- and single-acting hydraulic cylinders controlled by manually shiftable valves, the double-acting cylinder typically representing a tractor power-steering system and the single-acting cylinder representing a power brake system.

The valve body also has a nonpriority or secondary outlet port 38 connected to the larger bore portion 24 by means of an annular passage 40 and a second passage 42 axially spaced from the annular passage 40. The nonpriority port 38 is connected to a schematically illustrated nonpriority function 44 through a hydraulic conduit 46. The nonpriority hydraulic function is illustrated as a two-way hydraulic cylinder controlled by a manually shiftable valve, and typically represents one or more nonpriority hydraulic functions on a tractor such as a hydraulically operated loader or backhoe, the tractor rockshaft, or a hydraulic motor on a towed implement. The valve body also has a radially extending sump port 48 connected to the larger bore portion 24 through an annular passage, the sump port being connected to the reservoir 14 by a hydraulic line 50.

An elongated, generally cylindrical valve member or piston 54 is mounted in the valve bore 22 and includes a larger diameter portion 56 mounted in and conforming to the larger bore portion 24 and a smaller diameter portion 58 mounted in and conforming to the smaller bore portion 26. The larger diameter portion 56 has an annular recess 60 between axially spaced valve lands 62 and 64 at the opposite ends of the larger diameter portion. An axial bore 66 extends the length of the valve member 54, and a plurality of generally radially extending passages 68 connect the bore 66 with the exterior of the larger diameter portion 56 through the valve 1 and 62. An annular shoulder 70 is formed in the bore 66 downstream from the passages 68, and a closure member 72 is seated on the shoulder 70 and closes the bore 66 except for an orifice 74 in the member 72, so that fluid communication between the opposite ends of the valve member or piston 54 is established only through the orifice 74. A spring 76 acts between the closed end of the bore 22 and the closure member 72, biasing the valve member 54 toward the open or larger diameter bore portion 24 (to the left in the drawing). A radial passage 78 in the smaller diameter portion 58 of the member 54 connects the bore 66 to the exterior of the valve member downstream of the closure member 72.

The function of the closure member 72 and the function of the valve as priority valve is described in greater detail in said U.S. Pat. No. 3,349,670. During normal operation of the hydraulic system, the valve member 54 is in its nonpriority position, as illustrated in said U.S. Pat. No. 3,349,670, wherein the valve member is positioned so that the passages 68 are opposite the annular passage 40, so that the pump outlet conduit is connected to the nonpriority outlet port 38 through the passages 68 and 40, as well as being connected to the priority outlet port 30. As described in said patent, the valve member seeks the position wherein the net hydraulic force acting on the member counter balances the force exerted by the spring 76. Thus, the spring is selected so that within a given pressure range the spring deflection will position the passages 68 opposite the annular passage 40. For example, assuming that the larger diameter portion 56 of the valve member 54 has a five percent greater area then the smaller diameter portion 58, the valve member will seek a position wherein the spring force equals five percent times the area of the valve member times the pressure. Thus, assuming a normal input pressure of approximately 2,000 p.s.i., which is a typical pressure in a tractor hydraulic system, and a one square-inch piston or valve member area, there would be a net force of 50 pounds urging the piston toward the closed end of the bore (to the right in the drawing) so that the spring would have to deflect until it also exerts a 50 pound force. As mentioned above, the spring is selected so that the passages 68 and 40 are aligned when the input pressure is normal.

If the operation of the various hydraulic functions exceeds the capacity of the pump 10, the inlet pressure will fall, so that the pressure acting on the valve member 54 is reduced. Since the pressure is reduced, the force due to the area differential is also reduced, so that a smaller spring force is needed to counter balance the hydraulic imbalance, whereby the valve member will seek a new position wherein the forces are again balanced, shifting toward the open end of the bore 22 (to the left in the drawing). The shifting of the valve member to the left moves the passages 68 to the left of the annular passage 40, so that the pump outlet 12 is disconnected from the nonpriority port 38, whereby fluid pressure is communicated only to the priority conduit 36. Thus, in the above example, if the inlet pressure fell to 1,800 p.s.i., only a 45 pound spring force would be needed to counterbalance the hydraulic force on the valve member 54, so that the valve member would move to the left a sufficient amount to reduce the spring force by five pounds, the spring being selected so that such movement would close off the nonpriority port 38.

Conversely, if, due to forces exerted on the hydraulic function 44, a surge pressure were produced in the nonpriority hydraulic conduit 46 and fed back through the priority valve to the valve bore 22, the increased force due to the hydraulic imbalance would have to be balanced by a corresponding shift of the valve member 54 to the right. The shifting of the valve member to the right moves the passages 68 to the right of the annular passage 40, thereby disconnecting the nonpriority port 38 from the valve bore, as illustrated in the drawing. Simultaneously with the disconnection of the nonpriority function from the rest of the system, the annular recess 60 between the valve lands 62 and 64 connects the passage 42 with the sump port 48, thereby venting the excessive pressure in the nonpriority line 46 back to the reservoir. Of course, as soon as the pressure returns to normal, the valve member 54 shifts back to its normal position wherein the nonpriority port 38 is connected to the pump outlet rather than the reservoir. Depending on the relative location of the passages and the spring rate, any pressure could be preselected at which the above disconnection from the pump and the rest of the system occurs. For example, in the above-described system where 2,000 p.s.i. is the normal operating pressure, a shift a 2,500 p.s.i. would permit minor pressure fluctuation in the nonpriority line while protecting the system from the relatively high pressures over 2,500 p.s.i. Thus, the valve member acts as both a check valve, preventing the feedback of higher pressures to the rest of the system, and a relief valve, venting the excess pressure in the nonpriority function.

The valve also performs a third function during the start up of the system. When the system is not in operation, the greatly reduced pressure in the pump outlet causes the valve member 54 to shift all the way to the left, so that the larger diameter end of the valve member seats against the fitting 28. In this position, the passage 78 is aligned with the sump port 48, so that the pump outlet line is connected to the sump through the bore 66, the orifice 74, and the passage 78. When the engine, which drives the pump 10, is being started, it is cranked to a relatively low speed, so that the rate of flow from the pump is relatively small, the orifice 74 being selected so that it can handle the flow rate during the cranking of the engine. Thus, little load is imposed on the pump, decreasing the load on the engine and thereby increasing the starting speed of the engine for a given size starting motor. After the engine is started, the flow rate from the pump is too great for the orifice and pressure builds up in the pump outlet line 12. The increased pressure, of course, shifts the valve member 54 to the right, so that the passage 78 is no longer aligned with the sump port 48, thereby completely disconnecting the pump outlet from the reservoir. As is apparent, when the valve member is against the fitting 28 during the start up, the pump outlet is also disconnected from the nonpriority function, which often times contains an accumulator, so that the accumulator does not have to be pumped up until the system pressure reaches its normal value.

I claim

1. In a hydraulic system having a source of fluid pressure, a reservoir, and a plurality of hydraulic functions, including priority and nonpriority hydraulic functions, the improvement comprising: a valve body having a cylindrical valve bore with a first bore portion and a second bore portion having a smaller diameter than the first bore portion; first, second, third and fourth conduit means respectively connecting the valve bore to the fluid pressure source, at least one priority function, at least one nonpriority function and the reservoir; an axially slidable valve member having first and second diameter portions respectively conforming to and disposed within the first and second bore portions and axially slidable between a first position wherein it establishes fluid communication between the first conduit means and the second conduit means only, a second position wherein it established fluid communication between the first, second, and third conduit means only, and a third position wherein it establishes fluid communication between the third and fourth conduit means; a pressure-sensing passage means interconnecting the first and second bore portions on opposite sides of the valve member; and a spring means operatively engaging the valve member to bias it in the opposite direction from the net force exerted by the fluid pressure acting on the different diameter valve member portions, whereby the valve member shifts between its different positions in response to changes in fluid pressure acting on the valve member.

2. The invention defined in claim 1 wherein the valve member shifts to its first position when the fluid pressure falls below a first predetermined value, to its third position when the fluid pressure exceeds a second predetermined value, and shifts to its second position when the fluid pressure is between said first and second predetermined values.

3. The invention defined in claim 2 wherein the pressure-sensing passage means extends through the valve member.

4. The invention defined in claim 2 wherein the first, second, third and fourth conduit means communicates with the first bore portion.

5. The invention defined in claim 4 wherein the second, third and fourth conduit means are connected to the first bore portion at axially spaced intervals, and the first valve member portion has an annular recess about its periphery connecting the third and fourth conduit means in the third position of the valve member.

6. The invention defined in claim 5 wherein the passage means includes an orifice and the valve member is shiftable into a start-up position wherein it connects the first conduit means to the fourth conduit means through said passage means when the pressure acting on the valve member falls below a third predetermined value below said first predetermined value.

7. In a hydraulic system having a source of fluid pressure, a reservoir, and a plurality of hydraulic functions, including priority and nonpriority hydraulic functions, the improvement comprising: a valve body having a cylindrical valve bore with a first bore portion and a second portion having a smaller diameter than the first bore portion; first, second, third and fourth conduit means respectively connecting the valve bore to the fluid pressure source, at least one priority function, at least one nonpriority function and the reservoir; an axially slidable valve member having first and second diameter portions respectively, conforming to and disposed within the first and second bore portions and axially slidable between a first position wherein it establishes fluid communication between the first conduit means and the second conduit means only, a second position wherein it establishes fluid communication between the first, second, and third conduit means only, and a startup position wherein it connects the first conduit means to the fourth conduit means; a pressure-sensing passage means interconnecting the first and second bore portions on opposite sides of the valve member; and a spring means operatively engaging the valve member to bias it in the opposite direction from the net force exerted by the fluid pressure acting on the valve member, whereby the valve member shifts to its first position when the fluid pressure falls below a first predetermined pressure, to its second position when the pressure exceeds the first predetermined pressure, and to its startup position when the pressure falls below a predetermined value below the first predetermined pressure.

8. The invention defined in claim 7 wherein the pressure sensing passage means includes an orifice and the first conduit means is connected to the fourth conduit means through said orifice when the valve member is in its startup position.

9. The invention defined in claim 8 wherein the valve member is shiftable into a relief position wherein it connects the third conduit means to the fourth conduit means when the pressure exceeds a predetermined value above said first predetermined value.

10. The invention defined in claim 8 wherein the passage means extends axially through the valve member and the orifice is disposed within the valve member.

* * * * *